UNITED STATES PATENT OFFICE.

JOHN P. WALKER, OF ROLLA, MISSOURI.

PROCESS OF MAKING PRECIPITATED BARIUM SULFATE.

1,040,594.  Specification of Letters Patent.  Patented Oct. 8, 1912.

No Drawing.   Application filed August 17, 1911. Serial No. 644,629.

*To all whom it may concern:*

Be it known that I, JOHN P. WALKER, a citizen of the United States of America, residing at Rolla, in the county of Phelps and State of Missouri, have invented certain new and useful Improvements in Processes of Making Precipitated Barium Sulfate, of which the following is a full, clear, and exact description.

My invention relates to a process of making precipitated barium sulfate of a high degree of purity, very finely divided, and especially adapted for such uses as paints, enamels, wall papers, and writing papers.

The generally known and common method of making precipitated barium sulfate is as follows: Mineral barytes is first mixed with fine coal and heated to a high degree of temperature in a crucible, retort, or rotary furnace, with the result that the barium sulfate in the mineral is reduced to barium sulfid. The barium sulfid is then subjected to the action of hydrochloric acid, with resultant reaction of the barium sulfid and the production of a solution of barium chlorid. Then, to complete the process, sulfuric acid is added to the barium chlorid solution, and the desired precipitated barium sulfate is obtained.

The process just described is an expensive one, owing to the high heat necessary to reduce the barium sulfate to barium sulfid, the necessity for the use of an expensive reagent,—hydrochloric acid,—and the consumption of large quantities of sulfuric acid required for the carrying out of the process.

It is the object of my invention to provide a process by which precipitated barium sulfate may be produced much less expensively than by the process I have described. While it contemplates the employment of sulfuric acid as a solvent, it provides for the saving or recovery of the greatest percentage of the sulfuric acid, this being one of the main economical features in my process.

In carrying out my process, I pursue the following steps: The mineral barytes from which the precipitated barium sulfate is to be derived is first crushed to a requisite degree of fineness and placed in a primary tank, of suitable construction, that is capable of resisting the action of strong sulfuric acid. In this tank, I place strong sulfuric acid, preferably of a strength above ninety-six per cent. (96%), and preferably of sufficient quantity to cover the crushed mineral. The tank and its contents are then heated to a desired temperature and, as a result, the barytes and sulfuric acid produce a barytic and sulfuric acid solution in which such substances as silica settle to the bottom of the primary tank, leaving the main body of the solution free of such foreign substances.

The next step in my process consists in withdrawing the barytic and sulfuric acid solution in any suitable manner from the primary tank and introducing it into a secondary tank in which it mixes with water and by reason of which mixture there is complete precipitation of all of the barium in the solution as precipitated barium sulfate. The quantity of water with which the barytic and sulfuric acid solution is mixed in the secondary tank must be sufficient to cause complete separation of the barium from the sulfuric acid and its precipitation as barium sulfate, and experiments have determined that the most satisfactory results are obtained when the volume of water utilized is in the neighborhood of fifty per cent. (50%) of the volume of the solution mixed therewith. The water is preferably placed in the secondary tank before the barytic and sulfuric acid solution is delivered thereinto, but the reverse course may in some instances be followed; or, in some instances, the water and solution may be delivered into the secondary tank at the same time. I may here recite it as my belief that the reaction of sulfuric acid on mineral barytes and of water on the barytic and sulfuric acid solution is one indicated substantially by the following example:

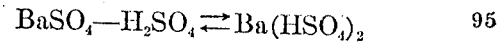

$$BaSO_4 - H_2SO_4 \rightleftarrows Ba(HSO_4)_2$$

In the foregoing example, the action of the sulfuric acid on the mineral barytes is shown by the compound following the upper arrow, and the result of the reaction when the barytic sulfuric acid solution is mixed with the water is shown by the compounds preceding the lower arrow. This example is given to indicate a point of economy in my process, since it shows that no sulfuric acid is used up or lost in the action on the pure mineral barytes, but is liberated completely from the compound by the use of the water employed and the consequent precipitation of the barium sulfate on one hand and only the dilution of the sulfuric acid on the other hand. The only chemical loss of acid is that resulting from the action of the acid on impurities that may be present in the mineral barytes, such, for instance, as iron and alumina.

The next step in my process consists in the removal of the diluted sulfuric acid from the secondary tank to permit access to the precipitated barium sulfate at the bottom of the tank. The precipitated barium sulfate may then, if it is desired to render it free of acid, be washed with water and, if necessary to remove all traces of free acid, an alkaline wash may be employed. After such washing, the precipitated barium sulfate may be dried before being placed on the market; or it may be sold in a moist state when it is to be used in the manufacture of paper, it being most desirable that the barium sulfate should not be dried before it enters into the manufacture of paper.

As previously mentioned, one of the economical features of my process is that it provides for the sulfuric acid utilized in carrying out the process being recovered and reused. The dilute acid solution that is separated from the barium sulfate in the secondary tank may be readily concentrated by any usual or ordinary process suitable for such concentration until the acid is of the desired strength for re-using in carrying out my process, or of a strength that will render it salable for other uses.

My process may be used in the manufacture of a paint material known commercially as "lithopone"; and, if I desire to make "lithopone" by my process, I may not wash all sulfuric acid from the precipitated barium sulfate, but leave sufficient to form the soluble sulfate of zinc upon the addition of the required amount of zinc. The zinc may be added in the form of oxid, the contents of the tank agitated, and hydrogen sulfid gas passed until the zinc is changed to zinc sulfid; or I may add instead of the oxid of zinc any salt of zinc or metallic zinc, or suitable material containing zinc, and pass hydrogen sulfid gas; or I may add some excess zinc oxid; that is, zinc oxid in excess of that which is precipitated as sulfid.

When the current of gas is shut off, allowing the contents of the tank to settle, the zinc sulfid and barium sulfate will settle in an intimate state of mixture and may be removed from the tank, dried and sold as "lithopone", or in the production of "lithopone".

My process being usable as specified in making paint material such as is known as "lithopone", I desire it to be understood that I claim the use of the process when employed in making precipitated barium sulfate in the manner described, and which may afterward be employed in a suitable manner in making "lithopone".

I claim:—

1. The process of making precipitated barium sulfate, which consists in subjecting mineral barytes to the action of strong sulfuric acid, thereby producing a barytic and sulfuric acid solution, and then precipitating the barium sulfate in such solution by diluting the solution with water.

2. The process of making precipitated barium sulfate, which consists in subjecting mineral barytes to the action of sulfuric acid of a strength above ninety-six per cent., thereby producing a barytic and sulfuric acid solution, and then precipitating the barium sulfate in such solution by diluting the solution with water.

3. The process of making precipitated barium sulfate, which consists in subjecting mineral barytes to the action of strong sulfuric acid, thereby producing a barytic and sulfuric acid solution, heating said solution, and then precipitating the barium in the solution by diluting the solution with water.

4. The process of making precipitated barium sulfate, which consists in subjecting mineral barytes to the action of strong sulfuric acid in a suitable receptacle, then removing said solution to another receptacle to separate it from matter foreign to the barytic and sulfuric acid elements, deposited in said vessel, and then causing precipitation of the barium in the solution by diluting the solution with water.

5. The process of making precipitated barium sulfate, which consists in subjecting mineral barytes to the action of strong sulfuric acid, thereby producing a barytic and sulfuric acid solution, then precipitating the barium sulfate in such solution by diluting the solution with water, and then withdrawing the diluted sulfuric acid from the precipitated barium sulfate.

6. The process of making precipitated barium sulfate, which consists in subjecting crushed or finely divided mineral barytes to the action of strong sulfuric acid, thereby producing a barytic and sulfuric acid solution, and then precipitating the barium sulfate in such solution by diluting the solution with water.

JOHN P. WALKER.

In the presence of—
HENRY CLIMO,
W. D. JONES.